J. POOL.

Improvement in Telescopic Kaleidoscopes.

No. 132,978.          Patented Nov. 12, 1872.

UNITED STATES PATENT OFFICE.

JAMES POOL, OF NEWARK, NEW JERSEY.

IMPROVEMENT IN TELESCOPIC KALEIDOSCOPES.

Specification forming part of Letters Patent No. 132,978, dated November 12, 1872.

*To all whom it may concern:*

Be it known that I, JAMES POOL, of Newark, Essex county, State of New Jersey, have invented a new and Improved Kaleidoscope; and I do hereby declare that the following is a full, clear, and exact description thereof, which will enable others skilled in the art to make and use the same, reference being had to the accompanying drawing forming part of this specification.

This invention relates to improvements in kaleidoscopes; and consists in the combination with the same, whether having two or more reflectors, of two lenses, under an arrangement whereby the images of external objects may be caused to take the place of the objects usually employed and be viewed in their stead.

Figure 1:
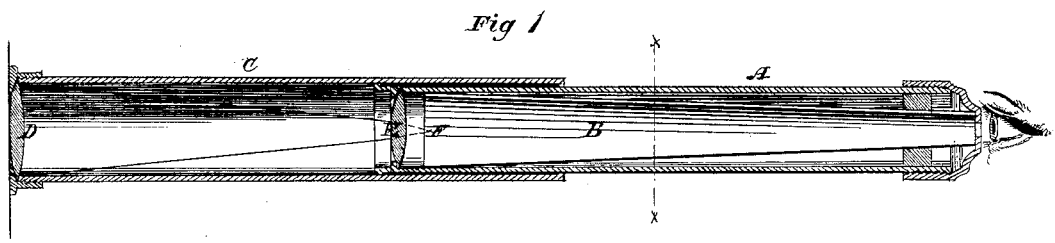
Figure 2:

Figure 1 represents a longitudinal section of a kaleidoscope arranged according to my improvement, and Fig. 2 represents a transverse section of the same taken on the line $x$ $x$ of Fig. 1.

Similar letters of reference indicate corresponding parts.

A represents the tube of an ordinary kaleidoscope, and B the reflectors thereof, to which I apply in front of the said reflectors, and preferably in a tube, C, having a telescopic connection with the tube A, an object-lens, D, and another lens, E, in the end of the tube A, as I prefer. These lenses have the effect to cause the focus of parallel or slightly-divergent rays to fall in the place at F, where the objects to be viewed are usually put, so that the images of external objects take the place of the objects usually employed and may be viewed in their stead. The images of external objects will be caused to fall upon the point F when only the object-glass D is used, and the lens E may be used or not, but the images are amplified by it.

Having thus described my invention, what I claim as new, and desire to secure by Letters Patent, is—

The combination, with the ordinary tube A and reflectors B, of tube C and object-lens D and movable lens E, all constructed and arranged as and for the purpose specified.

JAMES POOL.

Witnesses:
   GEO. W. MABEE,
   EDWARD MARTIN.